United States Patent [19]
Youden et al.

[11] 4,232,367
[45] Nov. 4, 1980

[54] APPARATUS FOR MAXIMIZING INTEREST EARNINGS AND PROVIDING PAYMENTS FROM PRINCIPAL WITHOUT INTEREST PENALTY

[76] Inventors: Robert H. Youden, 715 DeSoto Dr., Palo Alto, Calif. 94303; Charles S. Robertson, 1116 E. Rose Cir., Los Altos, Calif. 94022

[21] Appl. No.: 914,497

[22] Filed: Jun. 12, 1978

[51] Int. Cl.³ .............................................. G06F 15/30
[52] U.S. Cl. .................................... 364/408; 364/415
[58] Field of Search ................. 364/408, 415, 200, 900

[56] References Cited

U.S. PATENT DOCUMENTS

| | | | |
|---|---|---|---|
| 3,863,060 | 1/1975 | Rode' et al. | 364/715 |
| 3,946,218 | 3/1976 | Rode' et al. | 364/408 |
| 4,055,757 | 10/1977 | Tillman et al. | 364/715 |

*Primary Examiner*—David H. Malzahn

*Attorney, Agent, or Firm*—Robert S. Hulse; Roland I. Griffin

[57] ABSTRACT

A calculator apparatus is provided for computing minimum principal amounts for deposit into demand (passbook) accounts and into term (certificate-of-deposit) accounts paying interest at differing rates. The computed minimum principal amounts not only satisfy the minimum deposit requirements of the term accounts but, when deposited, provide both maximum interest earnings and payments from principal, without interest penalty ordinarily associated with early withdrawals. The apparatus comprises a keyboard, a read-write memory, a logic unit, a printer, and a display unit. The logic unit includes an arithmetic unit having a plurality of data storage registers and a read-only-memory with a stored program. The apparatus computes the minimum principal amounts in accordance with the stored program and in response to entered data.

6 Claims, 11 Drawing Figures

NO DESIRED PAYMENT AMOUNT SPECIFIED

| | | |
|---|---|---|
| Term (4 years) | 4. | *** |
| Deposit for Residual | 0.00 | *** |
| Residual | 0.00 | *** |
| Interest Rate | 7.50 | *** |
| | | |
| Term (3 years) | 3. | *** |
| Minimum Deposit | 1000.00 | *** |
| Monthly Payment | 106.89 | *** |
| Interest Rate | 7.50 | *** |
| | | |
| Term (2 years) | 2. | *** |
| Deposit | 1088.71 | *** |
| Monthly Payment | 106.89 | *** |
| Interest Rate | 7.00 | *** |
| | | |
| Term (1 year) | 1. | *** |
| Deposit | 1173.49 | *** |
| Monthly Payment | 106.89 | *** |
| Interest Rate | 6.50 | *** |
| | | |
| Deposit | 1145.40 | *** |
| Monthly Payment | 106.89 | *** |
| Interest Rate | 5.25 | *** |
| | | |
| Inflation Rate | 0.00 | *** |
| | | |
| Total Deposit | 4407.60 | *** |
| Residual | 0.00 | *** |
| Total | 4407.60 | *** |

Fig. 3B

$300 PAYMENT SPECIFIED

| | | |
|---|---|---|
| Term (4 years) | 4. | *** |
| Deposit for Residual | 0.00 | *** |
| Residual | 0.00 | *** |
| Interest Rate | 7.50 | *** |
| | | |
| Term (3 years) | 3. | *** |
| Minimum Deposit | 2806.70 | *** |
| Monthly Payment | 300.00 | *** |
| Interest Rate | 7.50 | *** |
| | | |
| Term (2 years) | 2. | *** |
| Deposit | 3055.68 | *** |
| Monthly Payment | 300.00 | *** |
| Interest Rate | 7.00 | *** |
| | | |
| Term (1 year) | 1. | *** |
| Deposit | 3293.64 | *** |
| Monthly Payment | 300.00 | *** |
| Interest Rate | 6.50 | *** |
| | | |
| Deposit | 3214.81 | *** |
| Monthly Payment | 300.00 | *** |
| Interest Rate | 5.25 | *** |
| | | |
| Inflation Rate | 0.00 | *** |
| | | |
| Total Deposit | 12370.83 | *** |
| Residual | 0.00 | *** |
| Total | 12370.83 | *** |

Fig. 3C

TOTAL DEPOSIT OF $10,000 SPECIFIED

| | | |
|---|---|---|
| Term (4 years) | 4. | *** |
| Deposit for Residual | 0.00 | *** |
| Residual | 0.00 | *** |
| Interest Rate | 7.50 | *** |
| | | |
| Term (3 years) | 3. | *** |
| Minimum Deposit | 2268.81 | *** |
| Monthly Payment | 242.51 | *** |
| Interest Rate | 7.50 | *** |
| | | |
| Term (2 years) | 2. | *** |
| Deposit | 2470.06 | *** |
| Monthly Payment | 242.51 | *** |
| Interest Rate | 7.00 | *** |
| | | |
| Term (1 year) | 1. | *** |
| Deposit | 2662.42 | *** |
| Monthly Payment | 242.51 | *** |
| Interest Rate | 6.50 | *** |
| | | |
| Deposit | 2598.71 | *** |
| Monthly Payment | 242.51 | *** |
| Interest Rate | 5.25 | *** |
| | | |
| Inflation Rate | 0.00 | *** |
| | | |
| Total Deposit | 10000.00 | *** |
| Residual | 0.00 | *** |
| Total | 10000.00 | *** |

$1000 DEPOSIT—
FOR-RESIDUAL

| | | |
|---|---|---|
| Term (4 years) | | *** |
| Deposit for Residual | 1000.00 | *** |
| Residual | 1349.82 | *** |
| Interest Rate | 7.50 | *** |
| | | |
| Term (3 years) | | *** |
| Minimum Deposit | 1000.00 | *** |
| Monthly Payment | 106.89 | *** |
| Interest Rate | 7.50 | *** |
| | | |
| Term (2 years) | | *** |
| Deposit | 1088.71 | *** |
| Monthly Payment | 106.89 | *** |
| Interest Rate | 7.00 | *** |
| | | |
| Term (1 year) | | *** |
| Deposit | 1173.49 | *** |
| Monthly Payment | 106.89 | *** |
| Interest Rate | 6.50 | *** |
| | | |
| Deposit | 1145.40 | *** |
| Monthly Payments | 106.89 | *** |
| Interest Rate | 5.25 | *** |
| | | |
| Inflation Rate | 0.00 | *** |
| | | |
| Total Deposit | 4407.60 | *** |
| Residual | 1000.00 | *** |
| Total | 5407.60 | *** |

Fig. 3D

RESIDUAL OF
$3000 REQUIRED

| | | |
|---|---|---|
| Term (4 years) | | *** |
| Deposit for Residual | 2222.52 | *** |
| Residual | 3000.00 | *** |
| Interest Rate | 7.50 | *** |
| | | |
| Term (3 years) | | *** |
| Minimum Deposit | 1000.00 | *** |
| Monthly Payment | 106.89 | *** |
| Interest Rate | 7.50 | *** |
| | | |
| Term (2 years) | | *** |
| Deposit | 1088.71 | *** |
| Monthly Payment | 106.89 | *** |
| Interest Rate | 7.00 | *** |
| | | |
| Term (1 year) | | *** |
| Deposit | 1173.49 | *** |
| Monthly Payment | 106.89 | *** |
| Interest Rate | 6.50 | *** |
| | | |
| Deposit | 1145.40 | *** |
| Monthly Payments | 106.89 | *** |
| Interest Rate | 5.25 | *** |
| | | |
| Inflation Rate | 0.00 | *** |
| | | |
| Total Deposit | 4407.60 | *** |
| Residual | 2222.52 | *** |
| Total | 6630.13 | *** |

Fig. 3E

```
NO DESIRED PAYMENT                              $106.89
AMOUNT SPECIFIED                            STARTING PAYMENT
                                            PAYMENT SPECIFIED
   $1000 DEPOSIT-
   FOR-RESIDUAL

6% INFLATION                              6% INFLATION

Term (4 years)        4. ***            Term (4 years)        4. ***
Deposit for Residual 1000.00 ***        Deposit for Residual 1000.00 ***
Residual             1349.82 ***        Residual             1349.82 ***
Interest Rate           7.50 ***        Interest Rate           7.50 ***

Term (3 years)        3. ***            Term (3 years)        3. ***
Minimum Deposit      1000.00 ***        Minimum Deposit      1191.65 ***
Monthly Payment       106.89 ***        Monthly Payment       127.31 ***
Interest Rate           7.50 ***        Interest Rate           7.50 ***

Term (2 years)        2. ***            Term (2 years)        2. ***
Deposit              1027.08 ***        Deposit              1223.31 ***
Monthly Payment       100.84 ***        Monthly Payment       120.10 ***
Interest Rate           7.00 ***        Interest Rate           7.00 ***

Term (1 year)         1. ***            Term (1 year)         1. ***
Deposit              1044.40 ***        Deposit              1243.93 ***
Monthly Payment        95.13 ***        Monthly Payment       113.30 ***
Interest Rate           6.50 ***        Interest Rate           6.50 ***

Deposit               961.71 ***        Deposit              1145.44 ***
Monthly Payment        89.74 ***        Monthly Payment       106.89 ***
Interest Rate           5.25 ***        Interest Rate           5.25 ***

Inflation Rate          6.00 ***        Inflation Rate          6.00 ***

Total Deposit        4033.19 ***        Total Deposit        4803.73 ***
Residual             1000.00 ***        Residual             1000.00 ***
Total                5033.19 ***        Total                5803.73 ***
```

APPARATUS FOR MAXIMIZING INTEREST EARNINGS AND PROVIDING PAYMENTS FROM PRINCIPAL WITHOUT INTEREST PENALTY

BACKGROUND OF THE INVENTION

As the rate of inflation and, hence, the cost of living grows higher, the need to produce correspondingly higher earnings from one's investments grows greater, especially for persons who need, on a regular basis, a predetermined minimum income on which to live.

In calculating income levels or rates of return on one's investment, electronic calculators capable of performing annuity calculations are often used. For example, electronic calculators have been developed which are capable of performing present value (PV), future value (FV), payment (PMT), number of payments (N), and interest (I) calculations. One such device is shown and described, for example, in U.S. Pat. No. 3,863,060 entitled "General Purpose Calculator With Capacity For Performing Interdisciplinary Business Calculations," issued to Francé Rodé, et al., Jan. 28, 1975.

However, such electronic calculators do not provide a means for calculating minimum principal amounts which could be deposited (invested) in demand accounts and in term accounts (e.g., certificate-of-deposit bank accounts which provide substantial loss of interest upon withdrawal or depletion of principal) in such a manner as to provide both a high yield and the opportunity to periodically withdraw or make payments from the deposited amounts without incurring interest penalty.

What is needed, therefore, is a convenient calculating device (e.g., a desk-top, hand-held or other portable electronic calculating device) that is capable of calculating minimum principal which could be deposited in one or more accounts with depletion-of-principal penalties so as to provide both maximum interest and penalty-free payments.

SUMMARY OF THE INVENTION

In accordance with the illustrated preferred embodiment of the present invention, a calculator apparatus is provided for computing (calculating) minimum principal amounts for deposit into a passbook account and into selected term accounts to provide maximum interest earnings and regular monthly payments from principal without interest penalty, for a selected number of years. The apparatus comprises a keyboard, a read-write memory, a logic unit, a printer, and a display unit. The logic unit includes an arithmetic unit having a plurality of data storage registers and a read-only-memory with a stored program. The apparatus utilizes interest rates and minimum deposit amounts prescribed for the various accounts (said rates and amounts being prestored in ROM 21) and calculates therefrom, in accordance with the stored program and in response to entered data such as payment and number-of-years, the minimum principal amounts.

BRIEF DESCRIPTION OF THE DRAWINGS

FIGS. 3A–3G are printed illustrations of output data produced by the calculator of FIG. 1.

DESCRIPTION OF THE PREFERRED EMBODIMENT

Figure 1:
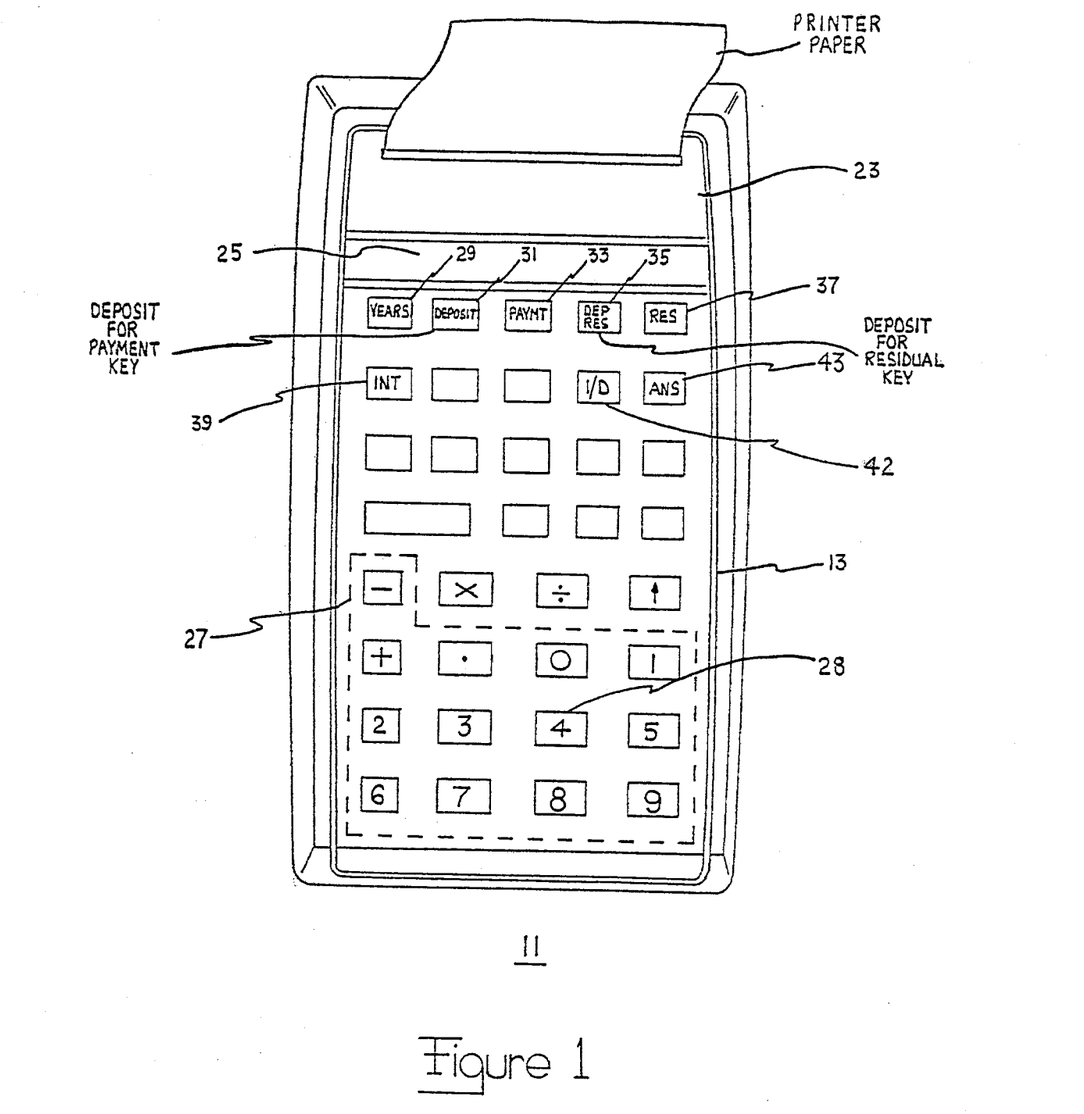
FIG. 1 is a top view of the calculator apparatus of the present invention.
Figure 2:
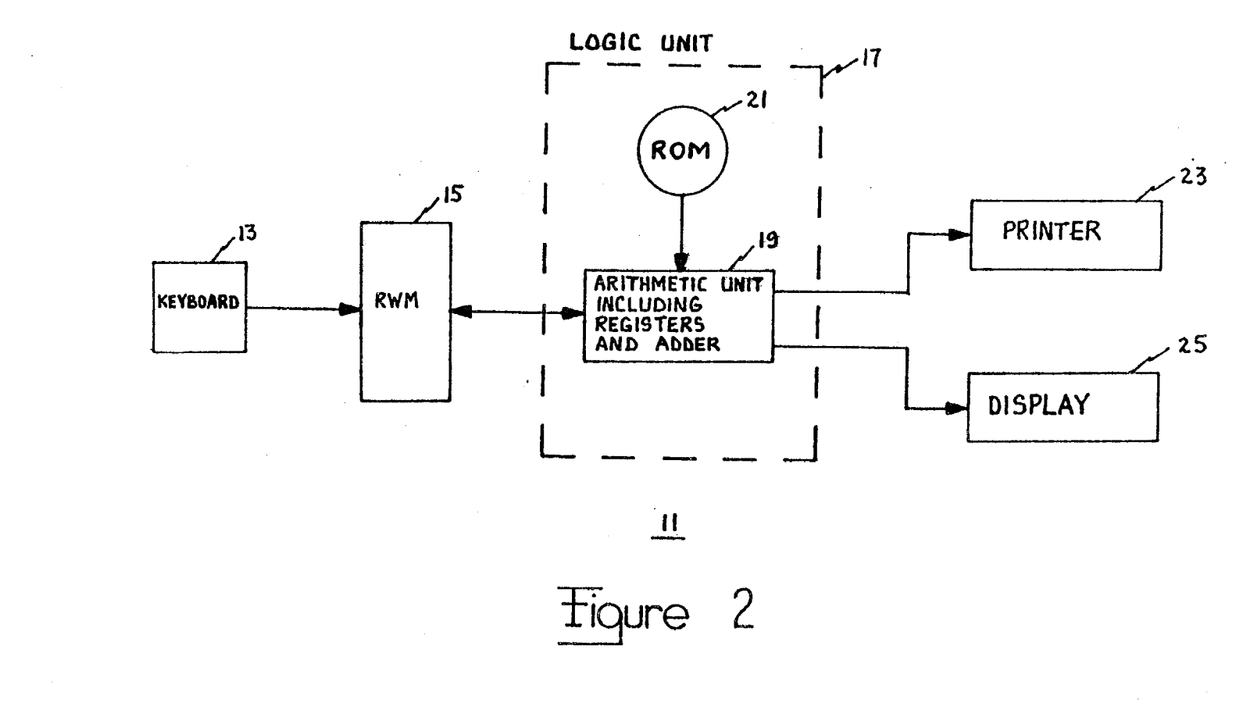
FIG. 2 is a block diagram of the calculator of FIG. 1.

Referring now to FIGS. 1 and 2, there is shown a calculator 11 having a keyboard or input means 13 for entering data, a read-write memory unit 15 for storing entered and processed data, and a logic unit 17 for processing the entered data and calculating minimum principal amounts therefrom. The minimum principal amounts may be deposited into a passbook savings account (i.e., a demand account) and into selected term accounts (certificate accounts) to earn maximum interest and provide periodic (e.g., monthly) payments from principal and interest without loss of interest (i.e., without incurring depletion-of-principal penalty) as demonstrated in the Appendix. The calculator 11 also includes a printer 23, and optional display unit 25 for printing and displaying, respectively, output data produced by logic unit 17. Logic unit 17 comprises an arithmetic unit 19, and a read-only memory unit (ROM) 21 with a stored program.

Figure 3D:
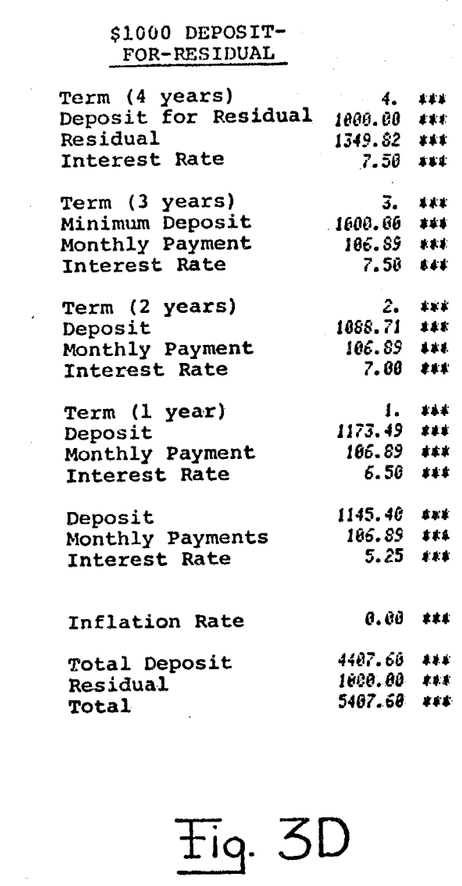

By depressing selected keys of keyboard 13, the user enters the number of years for which monthly payments (i.e., monthly withdrawals from his passbook account) are to be made. For example, by depressing key 28 and the YEARS key 29, the user enters the numeric quantity "4," representing the number of years that monthly withdrawals are to be made. The quantity "4" is then stored in memory 15 for later use. Thereafter, in response to depression of the ANS (answer) key 43 by the user, logic unit 17 accesses the entered data stored in memory 15 and calculates therefrom minimum principal amounts, which amounts may be deposited into selected term and passbook accounts to provide a desired monthly payment that is to be made over the selected period (four years). A printed list of these minimum principal amounts is shown in FIGS. 3A–3G. For example, FIG. 3A shows the quantities $1000, $1088.71, $1173.49 and $1145.40 as minimum principal amounts calculated by calculator 11 for deposit into a three-year term account, a two-year term account, a one-year term account, and a passbook account, respectively, to provide a $106.89 monthly payment, for a period of four years. The printed list is produced via printer 23 (FIG. 2). Also printed on the list is a sum of the minimum principal amounts, this sum representing the total amount (e.g., $4407.60) which must be deposited to provide the desired monthly payments of $106.89.

As shown in FIGS. 3A–3G, accounts which are utilized by calculator 11 and in which minimal principal amounts may be deposited are among those which are generally available at a bank, such as:

1. a passbook account requiring no minimum deposit and providing interest at 5.25% per year, and from which principal and interest can be withdrawn without penalty
2. a one-year term account requiring a minimum deposit of $1000 and providing interest at 6.5% per year, and from which no portion of the principal (the amount deposited) can be withdrawn before maturity (i.e., before the term of the account ends) without interest penalty (loss of interest)

3. a two-year term account requiring a minimum deposit of $1000 and providing interest at 7.0% per year, and from which no portion of the deposited principal can be withdrawn before maturity without interest penalty 4. a three-year term account requiring a minimum deposit of $1000 and providing interest at 7.5% per year, and from which no portion of the deposited principal can be withdrawn before maturity without interest penalty.

The interest rates of 6.5%, 7.0% and 7.5% per year represent the highest interest earnable from the one-, two-and three-year term accounts, where principal may not be depleted-without-penalty before maturity. The interest rate of 5.25% per year earnable from the passbook account represents the highest interest earnable from an account where principal may be depleted before maturity without penalty.

Data representing interest rates, length of term, and minimum-deposit amounts for the various accounts are prestored in ROM 21 (or, alternatively, may be entered via keyboard 13 or via a card reader or other entry device, and stored in RWM 15).

In providing the print-out shown in FIG. 3A (in response to entry of the numeral "4" followed by depression of the "YEARS" and "ANS" keys), logic unit 17 (FIG. 2) accesses the entered data from RWM 15 and prestored data from ROM 21, and calculates therefrom the minimum principal amounts that should be deposited in the passbook account and in the one-year, two-year and three-year term accounts to provide the minimum monthly payments.

Figure 4:
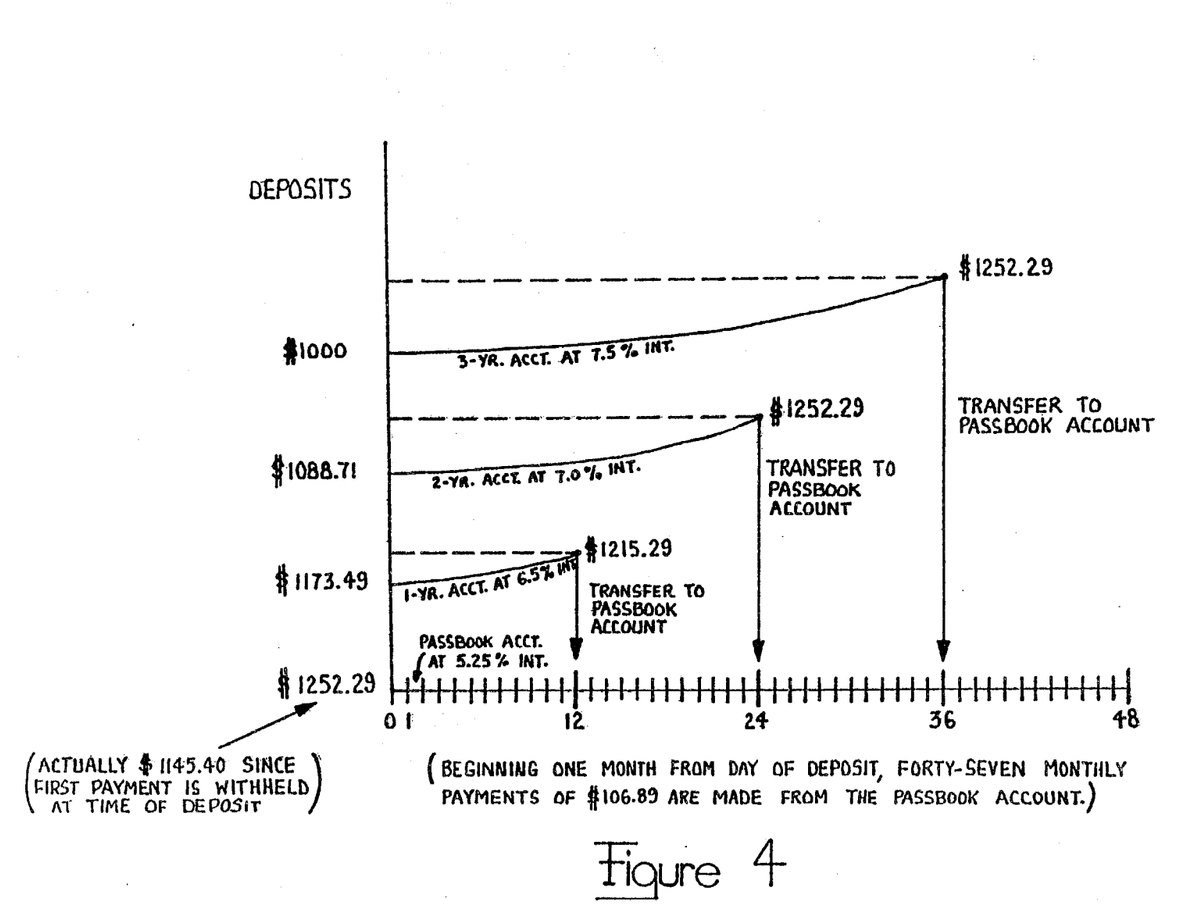
FIG. 4 is a graphic representation of deposits into and payments from various term-and passbook-accounts utilized by the calculator of FIG. 1.

As shown in FIG. 4, when a deposited principal amount matures at the end of the term of a term account, the matured amount (principal+interest) is transferred to the passbook account where monthly payments are made from principal and interest, without penalty.

In calculating the amounts that should be deposited in each account, logic unit 17 first selects the $(y-1)$th year term account (i.e., the term account having a duration or term equal to $y-1$ years, y representing the desired period). For example, if $y=4$, the three-year term account would be selected, and the minimum amount depositable in said term account (e.g., $1000) would be selected as a present or investment value quantity (IV) to be deposited in the account. Thereafter, a future value quantity (FV) is calculated, according to the following equations:

$$FV = IV(1+i)^y$$

where
 IV = amount deposited = 1000.00
 i = interest rate = $(1 + (0.075/360))^{360} - 1$
 y = term of the account = 3

Thus, a deposit of $1000 in the three-year term account (which account pays interest at the rate of 7.5% per year and which requires a minimum deposit of $1000) would produce a future value of $1252.29 in three years. At the termination of said three years (and the beginning of the fourth year), the matured amount ($1252.29) would be transferred to the passbook account where principal and interest could be withdrawn (during the fourth year) without penalty.

To provide a similar transfer of funds ($1252.29) from term to passbook account at the end of the second year and beginning of the third year, as shown in FIGS. 3A and 4, a deposit (IV) of $1088.71 to the two-year account would be required. This deposit is calculated by logic unit 17 as follows:

$$IV = FV(1+i)^{-y}$$

where
 FV = 1252.29
 i = $(1 + (0.07/360))^{360} - 1$
 y = 2

To provide for transfer of funds ($1252.29) from term to passbook account at the end of the first year and beginning of the second year, as shown in FIGS. 3A and 4, a deposit (IV) of $1173.49 to the one-year account would be required. This deposit is calculated by logic unit 17 as follows:

$$IV = FV(1+i)^{-y}$$

where
 FV = 1252.29
 i = $(1 + (0.065/360))^{360} - 1$
 y = 1

To provide for payments or withdrawals during the first year, the amount $1252.29 (actually 1145.40, if the first-month's payment is withheld from the amount deposited) is deposited directly into the passbook account at the beginning of the first year.

Thus, by summing the individual amounts scheduled for deposit in the various accounts ($1000+$1088.71+$1173.49+$1145.40), a minimum total of $4407.60 is shown to be required to generate the minimum monthly payments over the period (number of years) selected. The monthly withdrawal or payment figure (PMT) may be calculated as follows:

$$PMT = (FV(1+i)^{11}(i)/(1+i)^{12} - 1) = 106.89$$

where
 FV = $1252.29 deposit
 i = $(1 + (0.0525/360))^{30} - 1$
 360 represents the number of days per year
 30 represents the number of days per month
 0.0525 represents passbook annual interest rate
 11 represents the number of months of the first year (for which payments are to be made) less the first month (the payment for the first month having been withheld at the time the deposit was made)
 12 represents the number of months per year.

In the event the calculated monthly payment amount (PMT) is too small or too large to satisfy a payee's monthly needs, the amount may be changed by entering, via selected ones of the numeric keys 27 (FIG. 1), the desired new payment amount, then pressing the PMT key. This entry operation causes logic unit 17 to multiply the previously calculated payment value (PMTOLD) by a constant (ratio) equivalent to PMTNEW/PMTOLD, where PMTNEW is the monthly payment amount that is desired by the individual. For example, if a monthly payment of $300.00 was desired, the quantity "300.00" would be entered into the calculator 11 and stored in RWM 15 upon activation of the appropriate numeric keys 27, followed by activation of the PMT key. In which event, the minimum deposits to the various term and passbook accounts would be $2806.70, 3055.68, 3293.64 and 3214.81 as shown in FIG. 3B. Alternatively, the total deposit may be increased from a previous value (e.g., from $4407.60 as shown in FIG. 3A) to some desired value (e.g., to $10,000 as shown in FIG. 3C) to provide an increase in monthly payment (e.g., from $106.89 as shown in FIG. 3A, to $242.51 as shown in FIG. 3C). The desired deposit is entered by activating appropriate ones of the numeric keys 27, followed by activating the DEPOSIT key 31.

To deposit a selected amount into a term account (generally into the longest term account paying the highest interest rate) for the purpose of creating a residual (not for producing payments), selected ones of keys 27 are depressed, followed by depression of the deposit-to-residual key 35. For example, as shown in FIG. 3D, the $1000.00 deposited to the residual causes the residual to grow from $0 (as shown in FIG. 3A) to $1349.82 (as shown in FIG. 3D), and the total deposit of $4407.60 (as shown in FIG. 3A) to increase to $5407.60 (as shown in FIG. 3D).

Figure 3E:
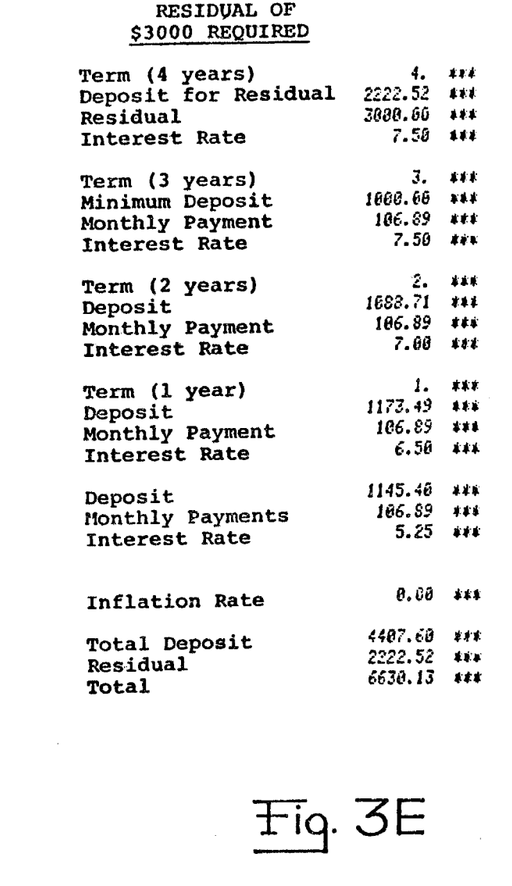

To determine the amount that must be deposited to the residual to accrue to or produce a desired residual amount at the end of the payment period, the desired residual amount is entered via keys 27, after which, the RES key 37 is depressed. For example, to produce or accrue a residual of $3000 at the end of a four-year payment period as shown in FIG. 3E, the quantity "3000" is entered via keys 27, after which, the RES key 37 is depressed. Logic unit 17 then calculates the amount to be deposited (e.g., 2222.52, as shown in FIG. 3E).

Figure 3F:
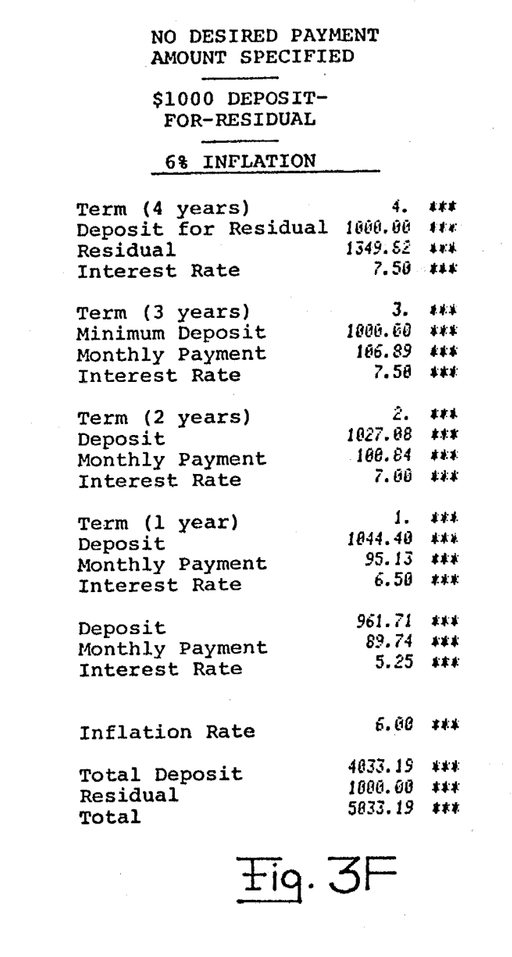

To include the effects of inflation or deflation in the calculations, monthly payments may be increased or decreased each year by a selected percentage. For example, if it is desired that the payments reflect a yearly inflation rate of six percent as shown in FIG. 3F, the user enters the numeric quantity "6.00" by depressing appropriate ones of keys 27 followed by depressing the inflation/deflation (I/D) key 42. If the entered numeric quantity is positive, the monthly payments are increased (inflated) each year by the percentage (e.g., 6%) specified. If the entered numeric quantity is negative, the monthly payments are decreased (deflated) each year by the specified percentage.

Figure 3G:
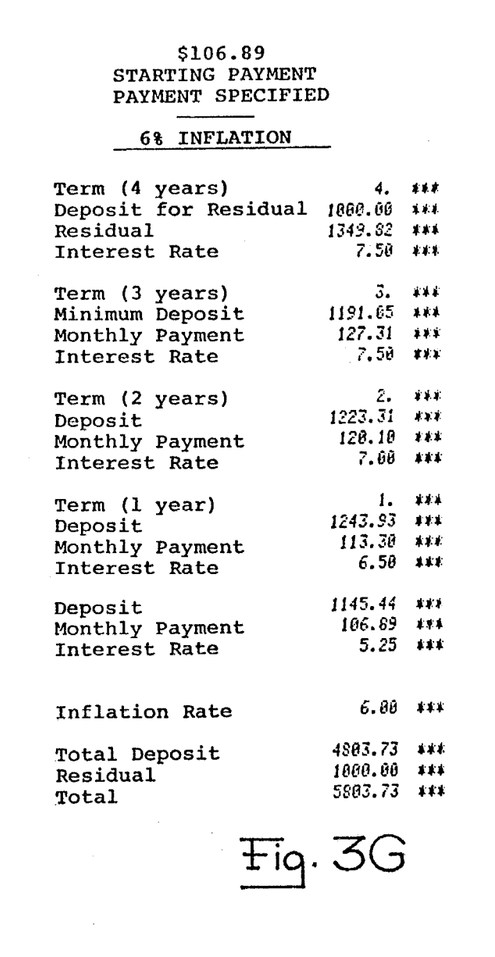

In addition to specifying a yearly inflation or deflation factor, the user may specify a desired minimum monthly payment. For example, as shown in FIG. 3G, monthly payments starting at $106.89 and increasing by 6% each year thereafter may be specified by the user upon actuation of appropriate ones of keys 27 and actuation of the PMT key 33.

Figure 5:
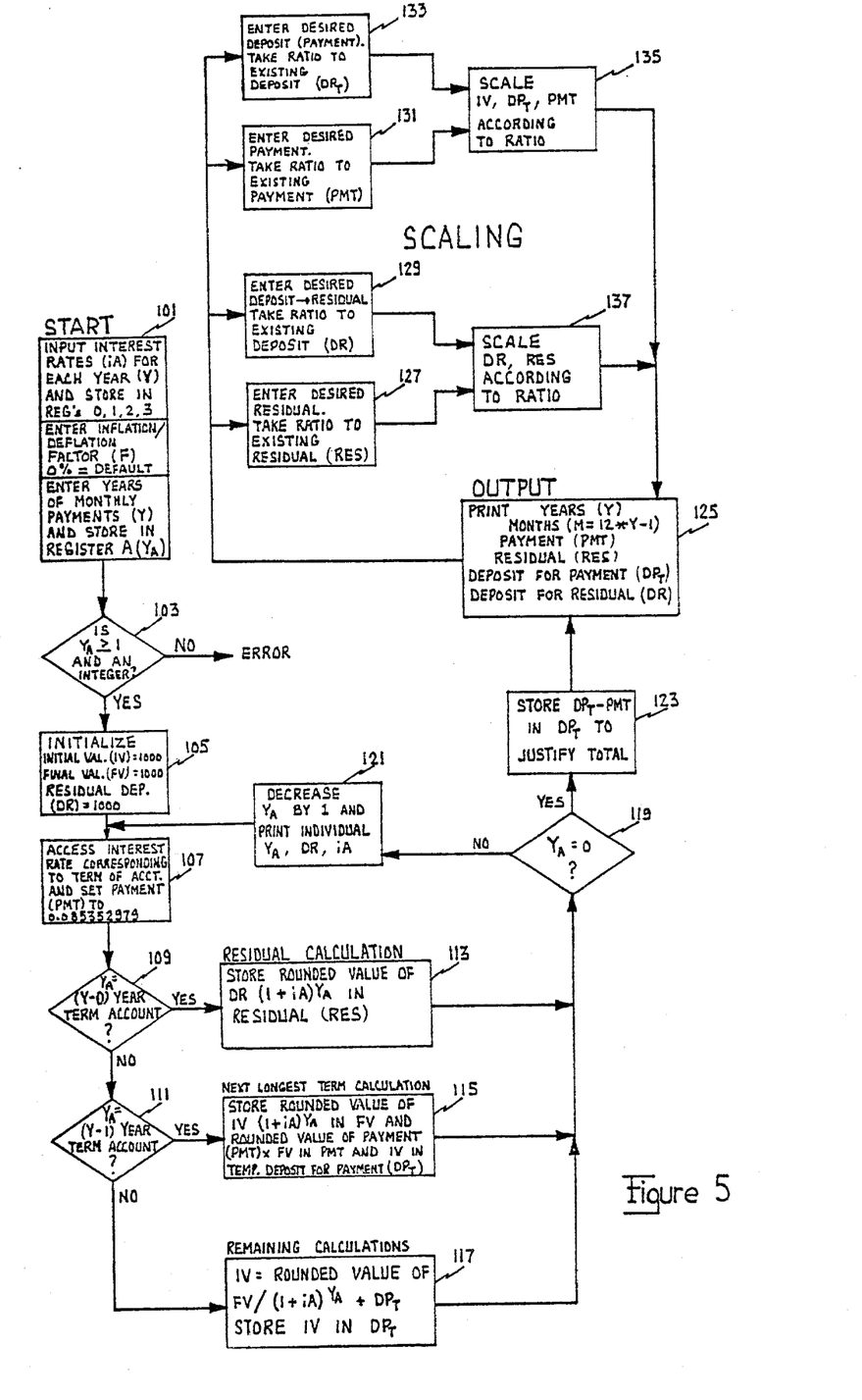
FIG. 5 is a flow chart of a program stored in the calculator of FIG. 1.

The foregoing describes output information produced by calculator 11 (as shown in FIGS. 3A-3G), in response to entered data. The manner in which calculator 11 produces this output information is described following, and shown in FIG. 5. The program shown in Table 1 is stored in ROM 21. As shown in FIGS. 2 and 5, arithmetic unit 19 of logic unit 17 operates in accordance with this stored program in computing the output values shown in FIGS. 3A-3G.

Block 101 of FIG. 5 shows the entry of interest rate information, deflation factor information, and desired-years-of-monthly-payments information into selected registers of calculator 11. Thereafter, as shown in block 105, variables such as residual, final or future value, and present or initial value (corresponding to the minimum deposit required to utilize a given term account) are set or initialized to a predetermined value (e.g., 1000). Block 107 shows the selection of an initial payment rate, and the accessing of an interest rate value corresponding to a given term account (e.g., the accessing from ROM 21 of the interest rate value of 7.5 corresponding to the three-year term account). The interest rate values of 5.25, 6.5, 7.0 and 7.5 are pre-stored in ROM 21 and accessed by arithmetic unit 19 in preparation for computation. Blocks 109 and 113 show the calculation of residual value (RES) for the longest-year period (e.g., the fourth-year period). Blocks 111 and 115 show the calculation of FV corresponding to the future value produced, from the minimum $1000 deposit, for the next-longest term account (e.g., the three-year term account). As shown by blocks 111 and 117, for shorter-period term accounts (e.g., two-year and one-year term accounts), a present or investment value IV is calculated based upon the previously calculated FV, and stored in register $DP_T$. These calculated values are later printed (via printer 23), as shown by block 125. In the event a desired residual, deposit-to-residual, payment, or deposit-to-payment is entered (as shown in blocks 127-133), the calculated values are adjusted or scaled as shown in blocks 135, 137, and the adjusted values are printed, as shown by block 125.

As shown in FIG. 5, and in the individual program instructions listed in Table 1 following, the registers of calculator 11 utilized by the program are 0-3, A, RES, FV, PMT, TEMP, $DP_T$, Y, M and DR.

TABLE 1

|     |        |     |       |
| --- | ------ | --- | ----- |
|     | RTN    | 059 | *LBL0 |
| 001 | *LBLo  | 060 | ROL1  |
| 002 | *LBLo  | 061 | ROL9  |
| 003 | 1      | 062 | Y     |
| 004 | X⇌Y    | 063 | F1?   |
| 005 | %      | 064 | GTO1  |
| 006 | +      | 065 | F2?   |
| 007 | STO4   | 066 | GTO2  |
| 008 | R/S    | 067 | RCLC  |
| 009 | *LBLe  | 068 | RCL4  |
| 010 | RCLA   | 069 | ÷     |
| 011 | 1      | 070 | STOC  |
| 012 | +      | 071 | R↓    |
| 013 | STO9   | 072 | RCL7  |
| 014 | CF0    | 073 | RCL4  |
| 015 | GTO0   | 074 | ÷     |
| 016 | *LBLA  | 075 | STO7  |
| 017 | STOA   | 076 | X⇌Y   |
| 018 | 1      | 077 | ÷     |
| 019 | X>Y?   | 078 | RCLB  |
| 020 | GTOa   | 079 | X⇌Y   |
| 021 | +      | 080 | +     |
| 022 | STO9   | 081 | STOB  |
| 023 | ENT↑   | 082 | LSTX  |
| 024 | INT    | 083 | RND   |
| 025 | X≠Y?   | 084 | ST+5  |
| 026 | GTOa   | 085 | GTO3  |
| 027 | P⇌S    | 086 | *LBL1 |
| 028 | RCL7   | 087 | RCLD  |
| 029 | P⇌S    | 088 | ×     |
| 030 | STO6   | 089 | STOE  |
| 031 | STOD   | 090 | STOC  |
| 032 | SF0    | 091 | CF1   |
| 033 | *LBL0  | 092 | RCLD  |
| 034 | SF1    | 093 | GTO3  |
| 035 | SF2    | 094 | *LBL2 |
| 036 | 0      | 095 | RCL6  |
| 037 | STOI   | 096 | ×     |
| 038 | P⇌S    | 097 | STO7  |
| 039 | RCL8   | 098 | P⇌S   |
| 040 | P⇌S    | 099 | RCL9  |
| 041 | STO8   | 100 | P⇌S   |
| 042 | *LBL9  | 101 | ×     |
| 043 | 1      | 102 | STOC  |
| 044 | ST-9   | 103 | RCL6  |
| 045 | *LBL8  | 104 | STOB  |
| 046 | RCL9   | 105 | RND   |
| 047 | RCL8   | 106 | STO5  |
| 048 | INT    | 107 | *LBL3 |
| 049 | X≠Y?   | 108 | RCL9  |
| 050 | GTO0   | 109 | GTO4  |

TABLE 1-continued

| | | | |
|---|---|---|---|
| 051 | RCL8 | 110 | *LBL7 |
| 052 | FRC | 111 | BRG |
| 053 | EEX | 112 | PSE |
| 054 | 2 | 113 | R/S |
| 055 | × | 114 | *LBL4 |
| 056 | STO8 | 115 | X≠0? |
| 057 | ISZI | 116 | GTO0 |
| 058 | GTO8 | 117 | R↓ |
| 118 | ST-5 | | |
| 119 | RCLB | | |
| 120 | RCLC | 177 | RCLD |
| 121 | − | 178 | X⇌Y |
| 122 | STOB | 179 | × |
| 123 | RND | 180 | STOD |
| 124 | RCL5 | 181 | RCLE |
| 125 | − | 182 | LSTX |
| 126 | F0? | 183 | × |
| 127 | GTOb | 184 | STOE |
| 128 | PRTX | 185 | R/S |
| 129 | RCLC | 186 | *LBLb |
| 130 | PRTX | 187 | DSP0 |
| 131 | P⇌S | 188 | RCLA |
| 132 | RCL5 | 189 | PRTX |
| 133 | P⇌S | 190 | P⇌S |
| 134 | PRTX | 191 | RCL6 |
| 135 | SPC | 192 | P⇌S |
| 136 | GTOb | 193 | × |
| 137 | *LBL0 | 194 | 1 |
| 138 | F0? | 195 | − |
| 139 | GTO9 | 196 | PRTX |
| 140 | DSP0 | 197 | STOI |
| 141 | PRTX | 198 | DSP2 |
| 142 | DSP2 | 199 | SPC |
| 143 | R↓ | 200 | 1 |
| 144 | PRTX | 201 | RCL4 |
| 145 | RCLC | 202 | % CH |
| 146 | PRTX | 203 | PRTX |
| 147 | R⇌S | 204 | RCLC |
| 148 | RCLI | 205 | PRTX |
| 149 | P⇌S | 206 | RCLE |
| 150 | PRTX | 207 | PRTX |
| 151 | SPC | 208 | SPC |
| 152 | GTO9 | 209 | RCLB |
| 153 | *LBLB | 210 | PRTX |
| 154 | RCLB | 211 | RCLD |
| 155 | GTO0 | 212 | PRTX |
| 156 | *LBLC | 213 | + |
| 157 | RCLC | 214 | PRTX |
| 158 | *LBL0 | 215 | SPC |
| 159 | ÷ | 216 | SPC |
| 160 | STX6 | 217 | GTO7 |
| 161 | RCLB | 218 | R/S |
| 162 | X⇌Y | | |
| 163 | × | | |
| 164 | STOB | | |
| 165 | LSTX | | |
| 166 | RCLC | | |
| 167 | × | | |
| 168 | STOC | | |
| 169 | R/S | | |
| 170 | *LBLD | | |
| 171 | RCLD | | |
| 172 | GTO0 | | |
| 173 | *LBLE | | |
| 174 | RCLE | | |
| 175 | *LBL0 | | |
| 176 | ÷ | | |
| 177 | RCLD | | |

APPENDIX

I. Draw Regular Periodic Payments: From what kind of account?
  a. Term accounts because of higher interest rates.
  b. But present regulations require a substantial penalty for early withdrawal of funds from a term account.

II. Penalty can be avoided by having a term account mature on or before each payment date.
  a. If the account matures on the payment date then there is just one single account (since any other maturing on that date can be combined with it).
  b. If the account matures before the payment date then there can be two or more accounts, running sequentially.

III. The choice between using one account or two or more accounts is made by determining which gives the desired payment with the minimum principal amounts for deposit.

IV. The relationship between the amount deposited in an account and the final value of the account is given by:

$$FV = PV(R)(1+i) \tag{1}$$

where
  FV is the final value of the account
  PV is the amount deposited
  R is the ratio of the amount transferred from the account to the amount available
  i is the interest rate per period
  n is the number of compounding periods V. Solving for PV, the principal amount for deposit:

$$PV = FV(R)/(1+i)^n \tag{2}$$

VI. For a given FV(R), PV will be a minimum when the quantity $$(1+i)^n \text{ is maximum.} \tag{3}$$

VII. The relationship between the amount deposited in a group of accounts running sequentially and the final value of the group is given by:

$$FV = PV(R1)(R2)\ldots(Rk)(1+i1)^{n1}(1+i2)^{n2}\ldots(1+ik)^{nk} \tag{4}$$

where
  FV is the final value of the group
  PV is the initial amount deposited
  R1, R2, ... Rk are the ratios of the amount transferred to the next account to the amount available
  i1, i2, ... ik are the interest rates
  n1, n2, ... nk are the compounding periods
The order in which the accounts are used is from left to right in the equation.

VIII. Solving for PV, the principal amount for deposit:

$$PV = FV(R1)(R2)\ldots(Rk)/(1+i1)^{n1}(1+i2)^{n2}\ldots(1+ik)^{nk} \tag{5}$$

IX. For a given FV(R1)(R2) . . . (Rk), PV will be a minimum when the quantity $$(1+i1)^{n1}(1+i2)^{n2}\ldots(1+ik)^{nk} \text{ is maximum.} \tag{6}$$

X. Any other sequence or order of this series of accounts, such as:

$$PV(R2)\ldots(Rk)(R1)(1+i2)^{n2}\ldots(1+ik)^{nk}(1+i1)^{n1} \tag{7}$$

will always have a product equal to FV (by the Commutative Law of Algebra, which states that the result of a product is independent of the order in which the elements of the product are taken).

XI. In the comparison of the single account to the two or more accounts it is necessary to compare to all possible sequences of the two or more accounts. However, a comparison to one sequence such as (4) above will suffice because all other products are identical.

XII. To compare the maximum interest earnings of the single account to the two or more accounts let:

$$PV(R1)(R2) \ldots (Rk) = PV(R), \quad (8)$$

$$i = i1, i2, \ldots ik = I \quad (9)$$

(all the interest rates the same), and $$n = n1 + n2 + \ldots + nk \quad (10)$$

(all the accounts run consecutively).

XIII. The final value of the two or more accounts is:

$$FV = PV(R)(1 + I)^{n1}(1 + I)^{n2} \ldots (1 + I)^{nk} = PV(R)(1 + I)^{n1+n2+\ldots+nk} = PV(R)(1 + I)^n \quad (11)$$

XIV. The final value of the single account is, from Equation (9)

$$FV = PV(R)(1+I)^n \quad (12)$$

XV. Since (11) is equal to (12) the accumulated earnings of two or more accounts of the same interest rates running consecutively for a given length of time will be identical to a single account for that same time and rate of interest.

XVI. In the Savings and Loan and Banking industries, accounts that have comparable minimum deposit requirements pay lower interest rates for those accounts that have shorter terms to maturity. Therefore, one of the values of I would have to be smaller by some amount. In any account, say for example the first one, let the new value of $$I = I - d \quad (13)$$

XVII. The earnings for the two or more accounts and the single account are:

$$FV = PV(R)(1+I-d)^{n1}(1+I)^{n2} \ldots (1+I)^{nk} \quad (14)$$

$$FV = PV(R)(1+I)^{n1}(1+I)^{n2} \ldots (1+I)^{nk} \quad (15)$$

When the earnings are compared, all the factors are equal except that $$(1+I-d)^{n1} < (1+I)^{n1} \quad (16)$$

Therefore no combination of shorter term accounts, with at least one lower interest rate, can equal the earnings of one single account running for the sum of the terms of the two or more accounts. The maximum earnings are achieved with one single account instead of a plurality of accounts, and each account is entirely independent of any other.

XVIII. Let the total of the minimum principal amounts be the sum of the independent individual minimum amounts.

$$PVt = PV1 + PV2 + \ldots + PVk \quad (17)$$

Assume that PVt is less by some amount e, then $$PVt - e = PV1 + PV2 + \ldots + PVk - e \quad (18)$$

But this is not possible since some PV on the right side of Equation (18) would have to be smaller by e, and this is not possible because each PV is already at a minimum. Therefore, the total of the minimum principal amounts is itself a minimum, and provides maximum interest earnings.

IXX. In the practical case, where accounts mature yearly, and payments are desired monthly, the funds necessary to carry the payments over the year are placed in an interim penalty-free passbook account. This apparatus gives the maximum possible earnings by following the above procedure in the internal calculations, including the passbook feature.

We claim:

1. Calculator apparatus for determining minimum principal amounts depositable into passbook and term accounts having pre-determined interest rates and minimum deposit requirements to provide maximum interest earnings and payments from principal without interest penalty, the apparatus comprising:

keyboard means having a plurality of keys for entering data including keys for entering a selected number of years and a key for initiating minimum principal calculations;

first memory means coupled to the keyboard means for storing entered data;

logic means coupled to the first memory means and including a second memory means having a program, the predetermined interest rates and the minimum deposit requirements stored therein for calculating, under control of the stored program and in response to actuation of the key for initiating minimum principal calculations, minimum principal amounts in accordance with the predetermined interest rates, the minimum deposit requirements and the number of years and payment amount selected, the minimum principal amounts being depositable into the passbook and term accounts to provide maximum interest earnings and payments from principal without interest penalty; and printer means coupled to the logic means for printing the calculated minimum principal amounts.

2. The calculator apparatus as in claim 1 wherein the keyboard means includes a key operable with selected ones of the keys for entering data to specify a desired payment.

3. The calculator apparatus as in claim 1 wherein the keyboard means includes a key operable with selected ones of the keys for entering data to specify a deposit for use in providing a desired payment.

4. The calculator apparatus as in claim 1 wherein the keyboard means includes a key operable with selected ones of the keys for entering data to specify a deposit for use in creating a desired residual.

5. The calculator apparatus as in claim 1 wherein the keyboard means includes a key operable with selected ones of the keys for entering data to specify a desired residual that is to be produced at the end of the selected number of years.

6. The calculator apparatus as in claim 1 wherein the keyboard means includes a key operable with selected ones of the keys for entering data to specify an inflation percentage factor by which the payments are to be adjusted.

* * * * *